United States Patent

[11] 3,632,226

| [72] | Inventors | Eric George Filby;<br>Derek John Hobbs, both of London, England |
|---|---|---|
| [21] | Appl. No. | 764,012 |
| [22] | Filed | Sept. 10, 1968 |
| [45] | Patented | Jan. 4, 1972 |
| [73] | Assignee | Johnson Mattey & Co. Limited<br>London, England |

[54] METHOD AND APPARATUS FOR DETERMINING OPACITY OF AN OBJECT
6 Claims, 7 Drawing Figs.

[52] U.S. Cl. ................................................. 356/203, 250/219 FR
[51] Int. Cl. ........................................................ G01n 21/30
[50] Field of Search ............................................ 356/203, 175; 250/219 FR

[56] References Cited
UNITED STATES PATENTS

| 2,641,158 | 6/1953 | Sweet | 356/203 |
| 3,012,466 | 12/1961 | Wiebe | 356/203 |
| 2,794,361 | 6/1957 | Shaffer | 356/203 |
| 3,091,697 | 5/1963 | Armbrecht | 356/203 X |

*Primary Examiner*—Ronald L. Wibert
*Assistant Examiner*—Orville B. Chew, III
*Attorney*—Cushman, Darby & Cushman

ABSTRACT: This invention relates to a method and apparatus for determining the opacity of an object, for example the opacity of a line or mark on a photographic plate. In carrying out the invention a beam of energy is interrupted by the object and a measure of the variation of energy along a path which intersects the energy shadow of the object is obtained using an energy-sensitive device. Where the source of energy is a source of light, the energy-sensitive device may be a photomultiplier.

The apparatus is particularly useful in connection with spectrographic analysis.

Fig. 1.

METHOD AND APPARATUS FOR DETERMINING OPACITY OF AN OBJECT

This invention relates to a method and apparatus for determining the opacity of an object, for example, the opacity of a line or mark on a photographic plate. Such apparatus is particularly suitable for use in spectrographic analysis.

According to this invention there is provided a method of determining the opacity of an object wherein a beam of energy is interrupted by the object and a measure is obtained of the variation of energy along a path which intersects the energy shadow of the object.

The invention also includes an apparatus for determining the opacity of an object including a source of energy from which a beam of energy can be directed on to the object and means for obtaining a measure of the variation of energy across the beam on that side of the object remote from the energy source.

Where an apparatus in accordance with this invention is used for measuring the opacity of a line or mark on a photographic plate, the apparatus includes means for causing relative movement between the beam of energy and the line or mark so that beam energy is partially interrupted by the line or mark, and means for obtaining a measure of the variation of the energy along a path which intersects the energy shadow of the object. Preferably the variation of energy is measured by an energy-sensitive device, and where the beam of energy is a beam of visible light the energy-sensitive device is conveniently a photomultiplier. The relative movement between the beam of energy and the line or mark on the plate is preferably systematic, for example sinusoidal.

According to one form of the invention, the means for obtaining a measure of the energy across the beam comprises an energy-sensitive device on to which the beam or part of it falls (such as a photomultiplier when the beam of energy is a beam of visible light); a cathode-ray tube so arranged that, firstly, the deflection of the spot in the X-direction is proportional to, in synchronism with, and in the same sense as or the opposite sense to that of the movement of the line or mark on the plate with respect to the energy beam. Secondly, the cathode-ray tube is also so arranged that the deflection of the spot in the Y-direction is controlled by the output of the energy-sensitive device or by the magnitude of some characteristic of it which is dependent upon the energy incident on it. Where the beam of energy is a beam of visible light, an optical system is provided for projecting an enlarged image of the line or mark on to a screen, such that relative movement between the said mark and the beam causes the said image to travel across a slit in the screen, behind which the energy-responsive device is located.

Relative movement between the beam of energy and the line or mark on the plate may be achieved by mounting the plate on a table capable of reciprocation in a direction at right angles to the axis of the beam or, alternatively, the beam may be caused to scan the plate by means of a system of rotating or oscillating mirrors.

One form of apparatus according to the invention and employing light energy will now be described by way of example, with reference to the accompanying drawings in which.

Figure 1:
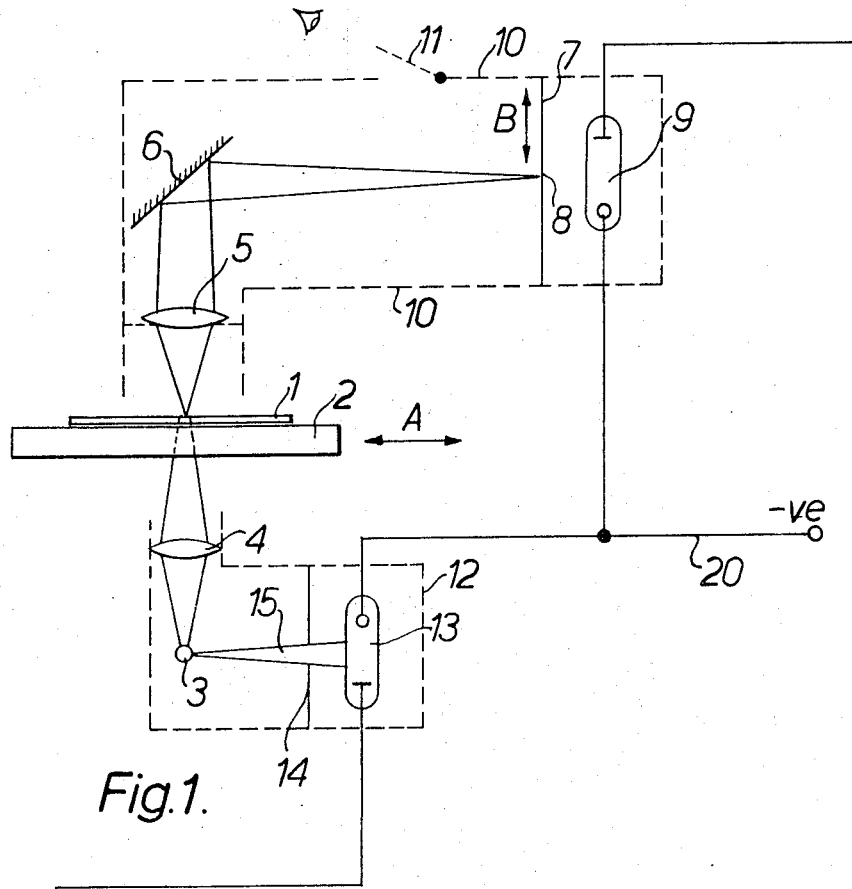
FIG. 1 is a circuit diagram of part of the apparatus enabling the Y-deflection of a cathode-ray tube spot representative of the opacity of a line on a photographic plate to be achieved.
Figure 1:
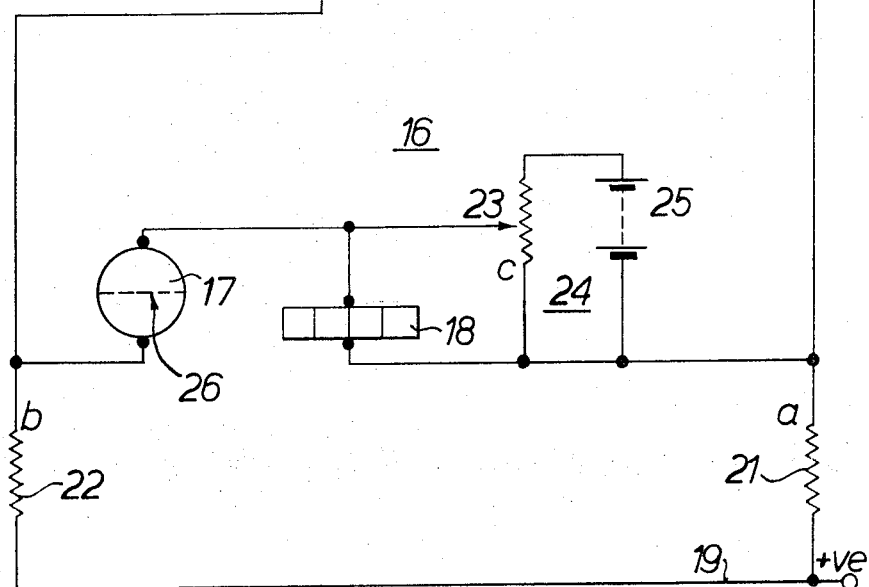

In FIG. 1, a photographic plate 1 carrying a photograph of a spectrum rests upon and is secured (by means not shown) to a horizontal table 2, which is capable of being moved backwards and forwards, in the direction shown by arrows A. The table 2 has a longitudinal slot over which the plate 1 is arranged so that light may be passed through it from a lamp 3 via a convex lens 4, both of which are located beneath the slot. The lamp 3 and convex lens 4 are so disposed beneath the table that a beam of light may be concentrated on to a small area of the plate and an optical system, represented by the convex lens 5 and mirror 6, is located above the table so as to form an enlarged image of a small area of the plate on a screen 7.

The screen 7 has an adjustable slit 8 behind which is located a photomultiplier tube 9 and the arrangement is such that when the table 2 is moved backwards and forwards in the directions of the arrows A, an enlarged image of a spectral line whose opacity is required may be caused to travel backwards and forwards across the slit 8 in screen 7 in the directions of the arrows B so that the small area of the plate containing the spectral line is, in effect, "scanned" by the slit 8.

The optical system 5, 6, the screen 7 and the photomultiplier 9 are mounted in a lighttight housing, indicated by the dotted line 10, which is provided with an inspection flap 11 to permit the screen 7 to be viewed when the apparatus is being set up or adjusted.

The lamp 3 and lens 4 are similarly mounted in a lighttight housing, indicated in this instance by the dotted line 12, which also contains a second photomultiplier tube 13. Interposed between the photomultiplier tube 13 and the lamp 3 is a light baffle 14 having an adjustable slit 15. The lamp 3, baffle 14, and photomultiplier 13 are so arranged that a controlled proportion of the light from the lamp falls upon the photomultiplier.

The photomultipliers 9, 13 are connected in the arms of a bridge circuit generally designated 16, which also contains a cathode-ray oscilloscope 17 and a digital voltmeter 18, the arrangement being such that the Y-deflection of the spot of the oscilloscope 17 is dependent upon the opacity of that part of the plate 1 being "looked at" by the slit 8 in screen 7, but is virtually unaffected by fluctuations in the brightness of lamp 3, and such that the Y-deflection of the spot may be measured by means of the voltmeter 18.

When the apparatus is in operation, the table 2 is caused, by means to be described later, to move backwards and forwards as indicated by arrows A and the spot of oscilloscope 17 is caused, by means also to be described later, to move backwards and forwards in the X-direction in synchronism with the movements of the table. An image of a spectral line is at the same time caused to travel backwards and forwards across slit 8 in screen 7 so that the trace on the screen of oscilloscope 17 will be of the form shown in FIG. 3 in which the peak height $H$ of the trace above a level corresponding to zero opacity represents the opacity of the line under examination. A measurement representative of this height is obtained by means of the digital voltmeter 18 when potentiometer 23 is adjusted to return the oscilloscope trace to a datum line 26.

Referring now to circuit 16 in more detail, photomultipliers 9 and 13 are connected between the positive and negative rails 19, 20 via load resistors 21, 22 respectively, the ends $a$, $b$ of which are connected together via the Y-terminals of the oscilloscope 17 and the potentiometer 23 of a biasing circuit 24 comprising the potentiometer just mentioned and a source of steady current represented by the battery 25. Finally a digital voltmeter 18 is connected between the wiper of potentiometer 23 and end $a$ of load resistor 21.

The method of using the apparatus to obtain readings representative of the opacity of a photograph of a spectral line on plate 1 for the purpose, for example, of determining the concentration, in a sample under analysis, of the element to which the line relates, is as follows.

The apparatus is first adjusted so that the voltmeter 18 reads zero for zero opacity. This is done by aligning the spot of oscilloscope 17 with a horizontal datum line 26 on the tube face when the voltage across the Y-terminals of the instrument is zero; focusing the image of a part of plate 1 sharply on to the screen 7; moving the plate on table 2 until a part of the image corresponding to a clear part of the plate falls on slit 8 and then, with the wiper of potentiometer 23 at end $a$ of the winding, adjusting the width of slit 15 and, thereby the intensity of illumination of photomultiplier 13, until the oscilloscope spot is again in alignment with the datum line 26. Under these conditions the reading of voltmeter 18 will be zero.

Figure 3:
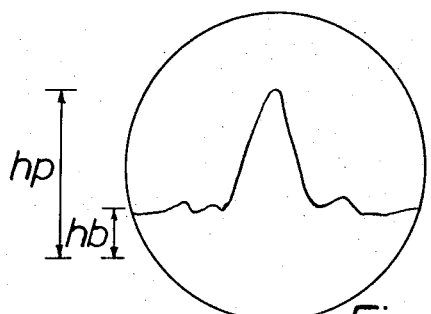
FIGS. 3 to 5 represent waveforms obtained on a cathode-ray tube screen during the operation of the apparatus.

Next, with table 2 centralized, the position of plate 1 on the table is adjusted until the image of the required line is focused on slit 8. The table is then set oscillating, as indicated by the arrows A in FIG. 1 and the amplitude of oscillation adjusted until a trace of the form shown in FIG. 3 is obtained on the oscilloscope screen. This trace will in general be superimposed on other small amplitude curves representing background "noise," etc., as indicated in FIG. 3, so that the trace will be displaced bodily above the datum line 26, which now corresponds to zero opacity.

Figure 4:
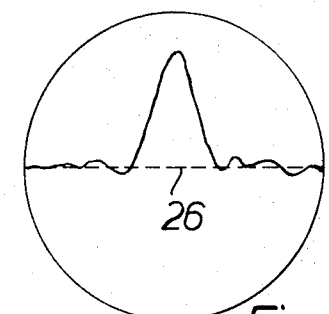
Figure 5:
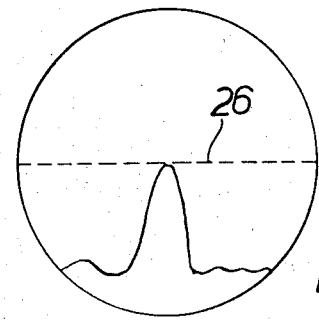

Finally, readings corresponding to the heights $h_b$ and $h_p$ (FIG. 3) of the base and peak respectively of the trace above a level corresponding to zero opacity are obtained by firstly adjusting potentiometer 23 until, as shown in FIG. 4, the mean level of the base of the trace is aligned with datum line 26 and noting the corresponding voltmeter reading ($V_b$) and then lowering the trace still further until, as shown in FIG. 5, the peak is in alignment with line 26 and again noting the voltmeter reading ($V_p$).

Readings $V_b$ and $V_p$ then represent respectively the beam energy of the "background" of the line and the beam energy of the most dense region of the line.

Figure 2:
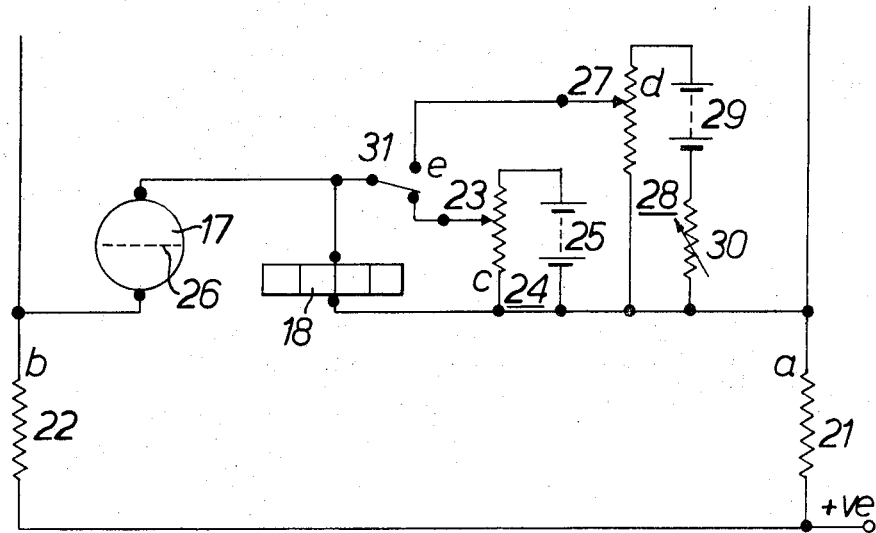
FIG. 2 shows a modified form of the electrical circuit of FIG. 1.

If a large number of measurements of $V_b$ and $V_p$ are to be made, the process may be facilitated by means of the modification of circuit 16 of FIG. 1 which is shown in FIG. 2. FIG. 2 includes an additional biasing circuit 28 which comprises a potentiometer 27 a source of steady current represented by the battery 29 and a variable resistance 30 and either of the biasing circuits 24 or 28 may be selected at will by means of the switch 31.

As before, the apparatus is set up initially so that, with switch 31 in the position shown and the wiper of potentiometer 23 at end $c$ of the winding, the voltmeter 18 will read zero for zero opacity and the oscilloscope spot will be on the datum line 26. With the switch in position $e$, however, the apparatus is set, by adjustment of resistance 30, so that the spot is on the datum line when the photomultiplier 9 is in darkness (as, for example, when a piece of card is placed over slit 8 in FIG. 1) and the wiper of potentiometer 27 is at end $d$ of the winding. The reading of the voltmeter 18 then corresponds to complete opacity and the advantage of the above arrangement is that only relatively small movements of the potentiometers 23 and 27 will be required to make measurements of $V_b$ and $V_p$ respectively.

As a further refinement, the voltmeter may be made to read some convenient number, such as 1,000, for complete opacity. This may be done by altering the sensitivity of the voltmeter.

As previously stated, it is necessary, during the operation of the apparatus, for table 2 of FIG. 1 to be oscillated as indicated by the arrows A and for the spot of oscilloscope 17 to be caused to move in the X-direction in synchronism with and in the same sense as or the opposite sense to the movements of the table.

Figure 6:
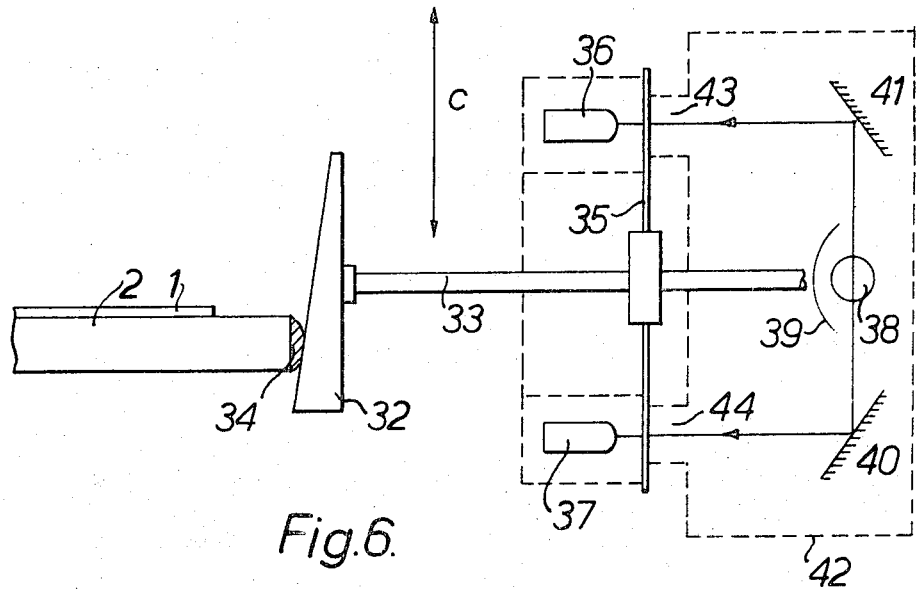
FIG. 6 illustrates diagrammatically the way in which a table is made to oscillate sinusoidally in the apparatus and part of the system whereby electrical signals proportional to the table displacement are obtained.

One highly successful way of doing this is indicated diagrammatically in FIG. 6. Here a rotatable face cam swashplate 32 connected to a shaft 33 which is driven at uniform rotational speed by an induction motor, or other suitable means, bears against a nylon pad 34, which is secured to one end of the table 2, and imparts oscillatory motion to it. The actual displacement of the table which, in practice may be required to be varied between about 0.34 and 0.001 inch, is adjusted by moving the swashplate and its associated driving shaft bodily in a direction at right angles to the plane of table 2, as indicated by the arrows C. Also secured to and driven by the shaft 33 is a circular optical wedge 35 which is such that the regions of maximum and minimum density are 180° opposed with uniform and continuous graduations of density between them. Two phototransistors 36, 37 are located on one side of the optical wedge 35 in a plane containing the axis of shaft 33, as shown in FIG. 6, and light from a lamp 38 shielded by screen 39 is passed through the regions of the optical wedge opposite the phototransistors by some convenient optical system such as the mirrors 40, 41. These, together with the lamp 38 are located in a housing 42 provided with openings 43 and 44.

Figure 7:
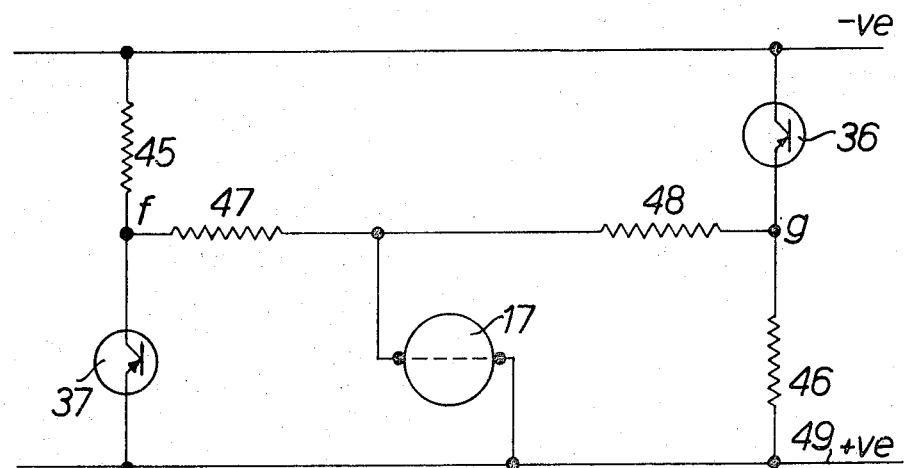
FIG. 7 shows an electronic circuit whereby the spot of a cathode ray tube is deflected in the X-direction proportionately to the table displacement.

The phototransistors are connected together in "push-pull" in the circuit shown in FIG. 7 in which 17 represents the oscilloscope with its X-terminals connected between the positive rail 49 and the junction of resistors 47, 48 the opposite ends of which are connected to ends $f$ and $g$ of load resistors 45, 46.

This circuit has the advantage that the response of the phototransistors to changes of incident light is made linear, or virtually so. Accordingly, if the optical wedge 35 or the phototransistors 36, 37 are angularly aligned with respect to the swashplate 32 so that they are equally illuminated when the table 2 is in its central (i.e., undisplaced) position, then the voltage applied to the X-terminals will be proportional to and of a sign corresponding to the sense of the displacement of the table from this position, and the spot will follow the table movements. For this purpose, the oscilloscope is arranged so that the magnitude and direction of the spot deflection are proportional to the magnitude and dependent upon the sign of the applied voltage. It is, of course, desirable that the spot should be arranged to be in the center of the screen when the table is in its rest position.

A further advantage of the above arrangement is that the maximum X-deflection of the oscilloscope spot will be independent of the maximum displacement of the table which, as previously indicated, may vary in practice from as little as 0.001 up to about 0.34 inch.

Two significant advantages of the apparatus according to the invention as just described are that:

a. the illumination of that part of the plate carrying the line or mark whose opacity is required may be made very high so that no separate amplification of the electrical signals produced is required (apart from the amplification provided by the amplifiers in a cathode-ray oscilloscope); and b. the cathode-ray oscilloscope is used as a null detector and, therefore, measurement is made by a null method. Any nonlinearity in the response of the photomultipliers and of other items in the apparatus may, therefore, be disregarded.

Although the invention has been specifically described with reference to the measurement of the opacity of a photograph of a spectral line, it is not, of course, so limited. Further, the relative movement between the energy beam and the line or mark whose opacity is required may be achieved in other ways than by causing the photographic plate or other carrier on which the line or mark is located to move with respect to the beam. The carrier could, for example, be held stationary and the beam caused to scan the line or mark by a system of rotating or oscillating mirrors or by some other means.

What we claim is:

1. Apparatus for determining the opacity of an object comprising a source of visible light, a screen having a slit therein, optical means to direct a beam of light from the source onto said object so as to project an image of the object onto the screen, a cathode-ray tube, a first photomultiplier located on that side of the screen remote from the object, means for causing relative movement between the beam and the object so that the image is caused to traverse the slit, the variation in the degree of excitation of the photomultiplier being dependent upon the variation of the light energy in the beam across the image of the object, said cathode-ray tube being operatively associated with said photomultiplier and said means for causing relative movement between said beam and said object so that deflection of the spot of the cathode-ray tube in one direction is proportional to the relative movement of said object and said beam of light and deflection of the spot in a second direction at right angles to the first direction is dependent upon the excitation of the first photomultiplier.

2. Apparatus according to claim 1 wherein said means for causing relative movement causes systematic movement.

3. Apparatus according to claim 1 including means whereby deflection of the spot in one direction is in synchronism with that of the said relative movement.

4. Apparatus according to claim 1 including table means to support said object, said table means being mounted for reciprocatory movement in a direction at right angles to the axis of the beam of light.

5. Apparatus according to claim 1 including a second photomultiplier associated with the first photomultiplier and the cathode-ray tube whereby displacement of the spot of the cathode-ray tube in the second mentioned direction is unaffected by any change in the intensity of light emitted from the source of visible light.

6. Apparatus according to claim 5 including a bridge circuit which comprises the cathode-ray tube and a digital voltmeter, said first and second photomultipliers being connected to the arms of said circuit.

* * * * *

PO-1050
(5/69)

UNITED STATES PATENT OFFICE
CERTIFICATE OF CORRECTION

Patent No. 3,632,226             Dated   January 4, 1972

Inventor(s)  Eric George Filby and Derek John Hobbs

It is certified that error appears in the above-identified patent and that said Letters Patent are hereby corrected as shown below:

(1) In the heading Foreign Application Priority Data should be added as follows:

-- Sept. 15, 1967    British    42267/67 --
(see claim for priority attached)

(2) In the heading, the name of the Assignee should read --JOHNSON, MATTHEY & CO. LIMITED-- as shown on the assignment of record (page 1 attached for convenience).

Signed and sealed this 29th day of August 1972.

(SEAL)
Attest:

EDWARD M. FLETCHER, JR.
Attesting Officer

ROBERT GOTTSCHALK
Commissioner of Patents